United States Patent
Zehnpfennig et al.

(10) Patent No.: US 9,632,183 B2
(45) Date of Patent: Apr. 25, 2017

(54) MITIGATION OF RADIO FREQUENCY INTERFERENCE (RFI) IN GLOBAL POSITIONING SYSTEM (GPS) SIGNALS

(71) Applicant: Raytheon Company, Waltham, MA (US)

(72) Inventors: David M. Zehnpfennig, Waltham, MA (US); Kenneth Goldmann, Waltham, MA (US); Omid Cherchian, Waltham, MA (US); Brian R. Gonzales, Waltham, MA (US)

(73) Assignee: Raytheon Company, Waltham, MA (US)

(*) Notice: Subject to any disclaimer, the term of this patent is extended or adjusted under 35 U.S.C. 154(b) by 630 days.

(21) Appl. No.: 14/088,154

(22) Filed: Nov. 22, 2013

(65) Prior Publication Data

US 2016/0154111 A1    Jun. 2, 2016

(51) Int. Cl.
*G01S 19/21* (2010.01)
*G01S 19/00* (2010.01)

(52) U.S. Cl.
CPC ............ *G01S 19/21* (2013.01); *G01S 19/215* (2013.01)

(58) Field of Classification Search
CPC .......... G01S 19/01; G01S 19/13; G01S 19/21; G01S 19/215; G01S 13/02; G01S 13/06; G01S 13/08; G01S 13/10; G01S 13/24; G01S 19/24; H04L 5/003; H04L 5/0058; H04L 5/0062; H04L 27/02; H04L 27/08; H04W 16/14

See application file for complete search history.

(56) References Cited

U.S. PATENT DOCUMENTS

| | | | | |
|---|---|---|---|---|
| 3,050,726 A | * | 8/1962 | Laurent | G01S 13/24 342/19 |
| 5,995,042 A | * | 11/1999 | Durboraw, III | G01S 19/215 342/357.58 |
| 6,448,925 B1 | * | 9/2002 | Shridhara | G01S 19/21 342/357.59 |
| 6,714,605 B2 | * | 3/2004 | Sugar | H04W 16/14 375/224 |

(Continued)

FOREIGN PATENT DOCUMENTS

| | | |
|---|---|---|
| TW | 201003108 A | 1/2010 |
| TW | 201241464 A | 10/2012 |

OTHER PUBLICATIONS

Hegarty et al.; Suppression of Pulsed Interference through Blanking; Proceedings of the IAIN World Congress and the 56th Annual Meeting of The Institute of Navigation; Jun. 28, 2000; pp. 399-408; The Institute of Navigation, Manassas, Virginia.

(Continued)

*Primary Examiner* — Bernarr Gregory

(57) ABSTRACT

A technology is provided for reducing pulsed radio frequency interference. The GPS signal may be received at a GPS device. The GPS device may include a GPS receiver. The GPS signal may include a plurality of sign and magnitude bits. Pulsed RFI may be detected in the GPS signal based on samples of the magnitude bits in the GPS signal. The pulsed RFI received at the GPS receiver may be reduced by communicating a blank signal when the samples of the magnitude bits indicate the pulsed RFI.

21 Claims, 5 Drawing Sheets

(56) References Cited

U.S. PATENT DOCUMENTS

| | | | | |
|---|---|---|---|---|
| 6,882,310 B1* | 4/2005 | Drentea | ............... | G01S 19/215 |
| | | | | 342/357.59 |
| 7,619,560 B2* | 11/2009 | Penna | ................ | G01S 19/24 |
| | | | | 342/357.77 |
| 7,994,975 B2* | 8/2011 | Abraham | ............ | G01S 19/21 |
| | | | | 342/357.59 |
| 8,238,410 B2* | 8/2012 | Lennen | ............. | G01S 19/21 |
| | | | | 375/144 |
| 8,253,624 B2* | 8/2012 | King | ............... | G01S 19/21 |
| | | | | 342/357.59 |
| 8,294,612 B2* | 10/2012 | Abraham | ............ | G01S 19/21 |
| | | | | 342/357.59 |
| 9,048,993 B2* | 6/2015 | Khandekar | ......... | H04L 5/0062 |
| 2004/0239559 A1* | 12/2004 | King | ............... | G01S 19/21 |
| | | | | 342/357.59 |
| 2007/0104299 A1 | 5/2007 | Cahn et al. | | |
| 2007/0291824 A1 | 12/2007 | Su | | |
| 2010/0119020 A1* | 5/2010 | Bhukania | ............ | H04L 27/08 |
| | | | | 375/345 |
| 2013/0148763 A1 | 6/2013 | Gunawardena et al. | | |

OTHER PUBLICATIONS

PCT application PCT/US2014/056791; filing date Sep. 22, 2014; Raytheon Company; International Search Report mailed Mar. 2, 2015.

\* cited by examiner

MITIGATION OF RADIO FREQUENCY INTERFERENCE (RFI) IN GLOBAL POSITIONING SYSTEM (GPS) SIGNALS

GOVERNMENT LICENSE RIGHTS

This invention was made with government support under Contract No. FA8682-10-C-0007 awarded by the Department of the Air Force. The government has certain rights in the invention.

BACKGROUND number of Global Positioning System (GPS) devices has grown rapidly in recent years among military, civil and commercial users around the world. In general, GPS is a space-based satellite navigation system that provides location and time information. GPS may function anywhere on or near the Earth where there is an unobstructed line of sight to four or more GPS satellites. Thus, GPS may not be accessible inside buildings, subterranean locations, or underwater. GPS has a variety of applications on land, at sea, and in the air. For example, GPS may facilitate activities such as banking, mobile phone operations, navigation of commercial aircraft and boats, scientific studies, tracking, and surveillance.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Global Positioning System (GPS) receivers may be used to provide location information in a wide range of situations. For example, GPS receivers may be used with automobiles, airplanes, missiles, mobile devices, etc. The GPS receiver may receive GPS signals from a plurality of satellites to determine the location of the GPS receiver. For example, a missile may use the GPS signals when calculating a navigational path or to follow a pre-determined navigational path. In some instances, the GPS signal received by the GPS receiver may include pulsed radio frequency interference (RFI). In general, a pulsed signal may experience a rapid change in amplitude from a baseline value to a higher or lower value, and then rapidly return to the baseline value. A pulsed signal may have a rectangular pulse, a cosine squared pulse, a Dirac pulse, a sinc pulse, a Gaussian pulse, etc.

The pulsed RFI may mask the GPS signal and as a result, the GPS receiver may be unable to determine its location based on the GPS signal. In other words, the pulsed RFI may have greater amplitude compared to a typical GPS signal, such that the pulsed RFI may mask the GPS signal. Therefore, a pulsed RFI mitigation technique may be used to identify the pulsed RFI in the GPS signal, and then remove the pulsed RFI from the GPS signal. The GPS signal substantially without the pulsed RFI may be communicated to the GPS receiver. As a result, the GPS device may successfully track the GPS signal to perform navigational functions.

Figure 1:
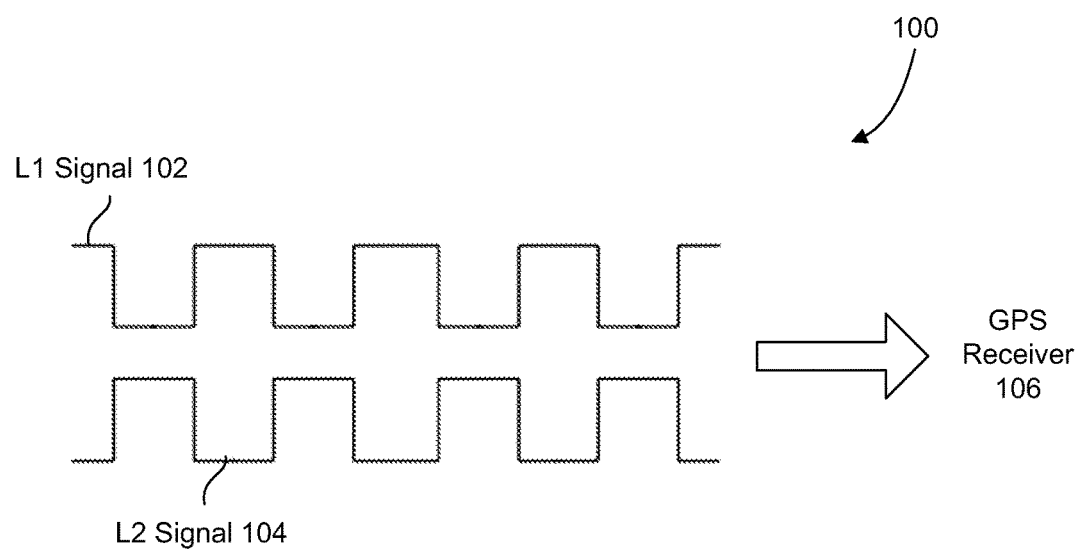
FIG. 1 is an example illustration of Global Positioning System (GPS) signals that are communicated to a GPS receiver in accordance with an embodiment of the present invention.

FIG. 1 is an example illustration 100 of GPS signals that are communicated to the GPS receiver 106. The GPS receiver 106 may receive the GPS signals using L1 and L2 frequencies. In other words, the GPS receiver may receive a L1 signal 102 and a L2 signal 104 from the plurality of satellites. The L1 signal 102 may be broadcasted at a frequency of 1.57542 Gigahertz (GHz) and the L2 signal 104 may be broadcasted at a frequency of 1.2276 GHz. The GPS receiver 106 may use band multiplexing between the L1 signal 104 and the L2 signal 104 with a 50% duty cycle at 200 Hertz (Hz). The L1 signal 102 or the L2 signal 104 may be blanked (i.e., no signal or a "0" signal) to the GPS receiver 106 on the opposite 50% duty of each L1 or L2 band. In other words, when the L1 signal 102 is blanked, then the L2 signal 104 is not blanked, and vice versa. Thus, the L1 signal 102 and the L2 signal 104 may each be blanked 50% of the time. As will be discussed in further detail below, the pulsed RFI in the L1 signal 102 may be mitigated independent of the L2 signal 104. Therefore, the pulsed RFI mitigation technique may be applied to both the L1 signal 102 and the L2 signal 104 for reducing the amount of pulsed RFI received at the GPS receiver 106.

The pulsed RFI may adversely impact the GPS receiver 106 by degrading the carrier to signal noise (C/No), wherein the C/No is expressed in decibels, or dB). When the pulsed RFI is reduced in both the L1 and L2 bands, the C/No ratio may increase. As an example, the pulsed RFI may reduce the C/No ratio by approximately 3.8 dB using the pulsed RFI mitigation technique, whereas the C/No ratio may be reduced by approximately 24 dB when the pulsed RFI mitigation technique is not used. In the absence of pulsed RFI, the C/No ratio of the GPS receiver 106 may be unchanged because substantially 100% of the GPS signal may be provided to the GPS receiver 106.

In one example, the pulsed RFI mitigation technique may be implemented in the existing firmware of the GPS receiver 106. For example, the pulsed RFI mitigation technique may be implemented in a field programmable gate array (FPGA) device included in the GPS device. The Very-High Speed Integrated Circuits Hardware Description Language (VHDL) associated with the FPGA device may be modified to reduce the pulsed RFI in the GPS signal. The pulsed RFI mitigation technique may support uniform operation over temperatures and gain variations in the antenna and GPS receiver 106. The pulsed RFI mitigation technique may be independent of frequency, duty cycle, pulse rate, and RFI signal magnitude. In addition, the pulsed RFI mitigation technique may be asynchronous, such that non-periodic RFI pulses and periodic RFI pulses may be mitigated. Furthermore, the pulsed RFI mitigation technique may not limit the RFI pulses to having a 50% duty cycle.

Figure 2:
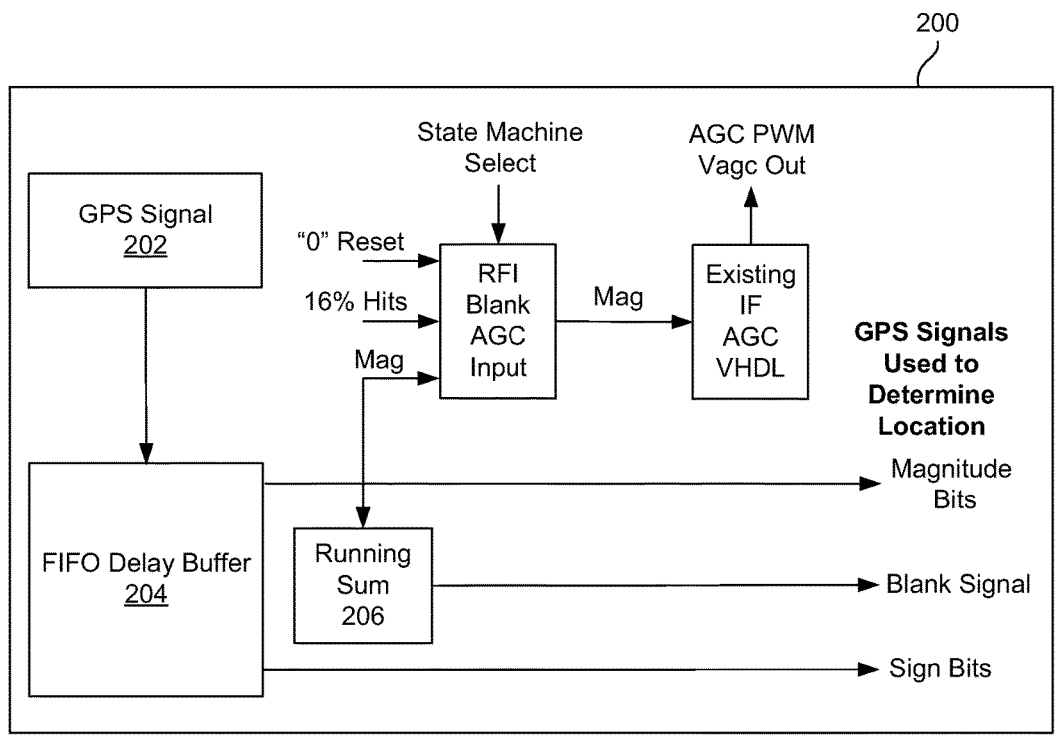
FIG. 2 is an example system for reducing radio frequency interference (RFI) in accordance with an embodiment of the present invention.

FIG. 2 is an example diagram of a system 200 for reducing the pulsed RFI in the GPS signal 202. In one example, the system 200 may be implemented in a field programmable gate array (FPGA) included in a GPS device. As previously discussed, the GPS receiver may receive the GPS signal 202 (i.e., the L1 signal and the L2 signal) via an antenna. The GPS signal 202 may be provided to a First In-First Out (FIFO) delay buffer 204, wherein the GPS signal includes a plurality of sign and magnitude bits. As the FIFO delay buffer 204 receives the GPS signal 202, a pre-defined number of GPS signal samples may be temporarily stored in the FIFO delay buffer 204. In one example, the FIFO delay buffer 204 may retain 128 GPS signal samples. The 128 GPS signal samples may continuously be updated as new GPS signals are received by the FIFO delay buffer 204.

In one example, the magnitude bits included in the GPS signal samples may indicate input signal levels into the GPS receiver. For example, the magnitude bits may indicate a "1" state (or a "hit") when its signal level (or signal power) exceeds an expected mean signal level (or mean signal power) by a specified deviation. In contrast, the magnitude bits may indicate a "0" state (or a non-hit) when the signal level corresponds to the mean signal level. As will be discussed below, the magnitude bits may be used to distinguish pulsed RFI data from non-pulsed RFI data in the GPS signal 202.

A running sum 206 of the magnitude bits that indicate a "hit" may be determined in the FIFO delay buffer 204. The pulsed RFI may be detected in the GPS signal 202 depending on the number of "hits" that are detected in the FIFO delay buffer 204. In particular, if the running sum 206 of the magnitude bits reveals a pre-defined number of consecutive hits, then the GPS signal 202 may be presumed to have pulsed RFI. In one example, if the running sum 206 of the magnitude bits indicates 100 or more hits in a row, then the GPS signal 202 may be presumed to have pulsed RFI. In other words, at least 100 consecutive hits out of 128 samples may indicate the presence of pulsed RFI in the GPS signal 202.

When pulsed RFI is detected in the GPS signal 202, a blank sample may be provided to the GPS receiver instead of the GPS signal 202 having the pulsed RFI. In one example, the blank sample may be provided to the GPS receiver in response to the 100 consecutive samples indicating a magnitude "hit." If the running sum 206 indicates less than 100 consecutive magnitude hits (or zero magnitude hits), then the blank sample is not provided to the GPS receiver. In another example, if 100 non-consecutive "hits" are determined out of the 128 samples, then the blank sample is not provided to the GPS receiver.

In one example, when 100 or more hits occur in a row, the output of the FIFO delay buffer 204 (i.e., the sign and magnitude bits of the GPS signal 202) may be multiplexed with a blanked output (i.e., zero data). The output of the FIFO delay buffer 204 multiplexed with the blanked output may produce the blank signal. The blank signal may be input to the GPS receiver. In other words, the GPS receiver may receive zero data when the running sum 206 indicates that the GPS signal 202 contains pulsed RFI. When less than 100 hits occur in a row, the output of the FIFO delay buffer 204 may be input to the GPS receiver.

As discussed in further detail below, the blank signal may be fed to the GPS receiver for a predefined period of time. For example, the blank signal may be fed to the GPS receiver for an additional 160 samples. As a result of the GPS receiver receiving the blank signal, the pulsed RFI in the GPS signal 202 may not inhibit the functionality of the GPS receiver. After a pre-defined period of time, the GPS receiver may stop receiving the blank signal and receive GPS signals without pulsed RFI. Therefore, the GPS receiver may receive GPS signals not having pulsed RFI with intervals of blank signals. The intervals of blank signals may indicate portions of the GPS signals where pulsed RFI was removed.

In one example, the output of the FIFO delay buffer 204 may be communicated to a Selective Availability Anti-Spoofing Module (SAASM). The SAASM may be a GPS receiver used by the military to allow decryption of GPS signals. Since GPS relies on low-powered frequency waves traveling from satellites to GPS receivers on the ground, GPS may be vulnerable to intentional jamming by enemies in a military scenario. Thus, the SAASM may decrease the likelihood of the GPS receiver receiving a spoofed signal (i.e., an intentionally modified GPS signal that causes the GPS receiver to determine an incorrect location). In addition, the blank signal may be communicated to the SAASM during periods when pulsed RFI is detected in the GPS signal 202. The SAASM may decrypt the GPS signal and use the decrypted GPS signal for determining a geographical location of the GPS device.

Alternatively, the output of the FIFO delay buffer 204 (i.e., the sign and magnitude bits of the GPS signal 202) may be communicated to a positioning module. The positioning module may receive the blank signal and a GPS signal without pulsed RFI. The positioning module may receive the blank signal for the predefined time period or for up to 100 microseconds upon detection of the pulsed RFI in the GPS signal. The positioning module may determine a geographical location of the GPS device using the GPS signal without pulsed RFI. In other words, the location may be determined without the SAASM first decrypting the GPS signal without pulsed RFI.

When the blank signal is communicated to the GPS receiver, a fixed magnitude hit ratio data stream may be input to an automatic gain control (AGC) VHDL, such that the blanked signal may have a minimized effect on the AGC. In general, AGC may be an adaptive system found in GPS devices. The average output signal level may be fed back to adjust the gain to an appropriate level for a range of input signal levels. In GPS devices, the AGC acts as a variable gain amplifier, adjusting the power of the incoming GPS signal to minimize quantization losses. In one example, a fixed 16% magnitude hit ratio may be input to the AGC. In addition, since the pulsed RFI may be determined based on 100 consecutive samples having a magnitude hit, the AGC may be similarly controlled when the GPS receiver receives continuous wave (CW) jamming signals or broadband jamming signals.

In one example, the running sum 206 determines a predefined number of non-hits (i.e., samples that do not indicate a "1"), and then a zero signal may be fed into the AGC to automatically increase the gain. For example, a zero signal may be fed into the AGC when the running sum 206 determines 1280 consecutive non-hit samples. In other words, a second running sum may be kept for 1280 samples to reset the AGC if pulsed RFI is not detected in the GPS signal samples. In addition, the pulsed RFI signal may be detected and reduced in the L1 frequency independent of the L2 frequency. Therefore, the pulsed RFI technique for reducing pulsed RFI from the GPS signal may be performed independently for both the L1 and L2 frequencies.

In one example, the GPS signal may include continuous RFI and then revert to a pulsed RFI. Since the AGC may have attenuated the intermediate frequency (IF) signal, the magnitude bit associated with the pulsed RFI may appear as a normal signal (i.e., a GPS signal without RFI) during the ON portion of the pulse. During the OFF portion of the pulse, the magnitude bit may appear as a string of zeros. As a result, the blank signal may not be multiplexed with the GPS signal because the GPS signal may be attenuated by the IF AGC. Thus, a string of zeros may be communicated to the AGC state machine for a predetermined time period (e.g., 10 milliseconds). After the 10 ms, the AGC may return to maximum IF gain and the running sum 206 may continue to detect for pulsed RFI based on GPS signal samples temporarily stored in the FIFO delay buffer 204.

Figure 3:
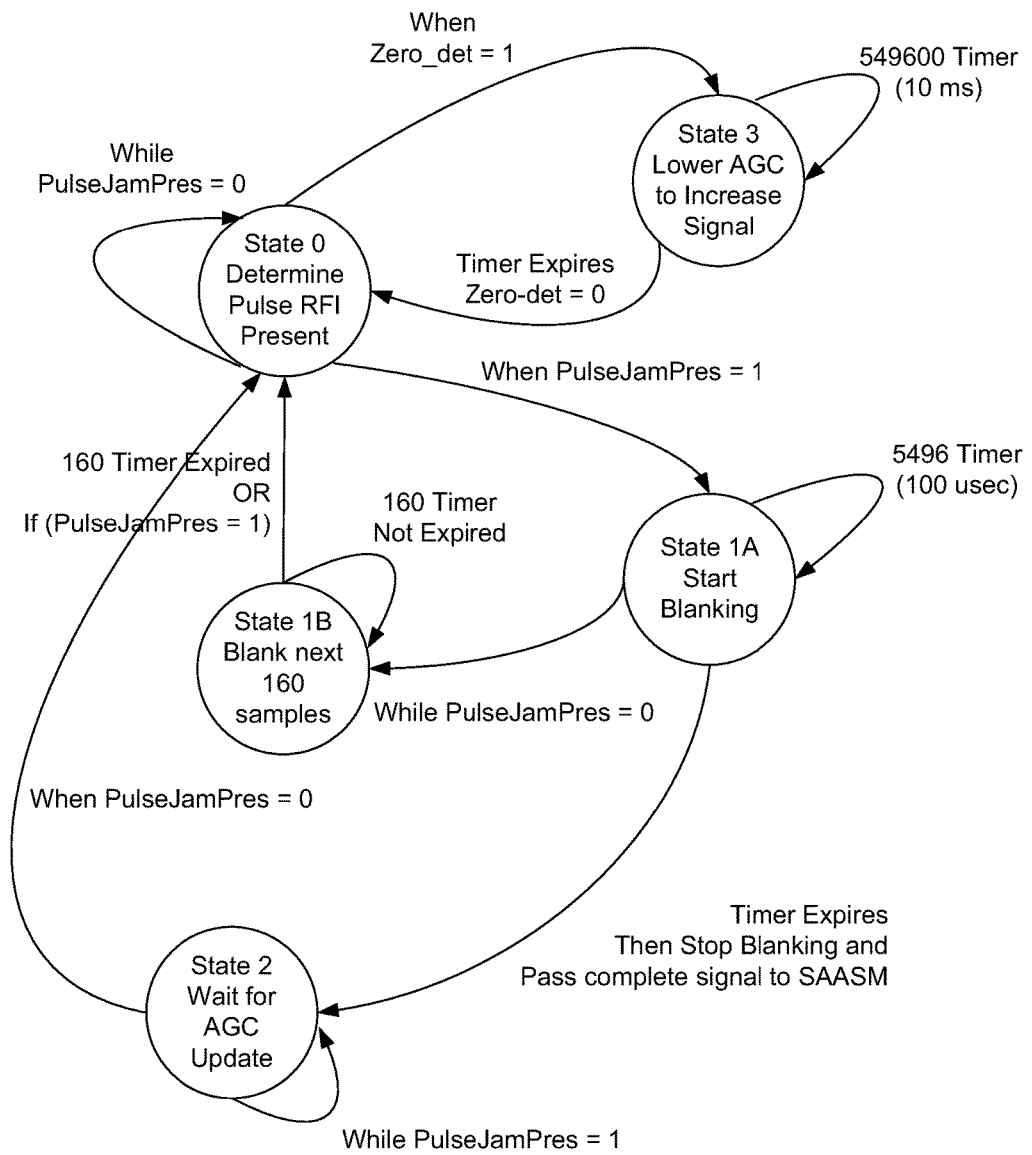
FIG. 3 is an example diagram of a method for reducing radio frequency interference (RFI) in accordance with an embodiment of the present invention.

FIG. 3 is an example diagram of a method for reducing RFI in a GPS signal. The pulsed RFI mitigation technique may be controlled by a state machine which changes state dependent on the type of input GPS signal, such as pulsed RFI or conventional RFI. Conventional RFI may include continuous wave (CW) jamming signals and broadband jamming signals. The state machine may include four states: State 0, State 1, State 2 and State 3. State 1 may include State 1A and State 1B.

At State 0, RFI may be determined in the GPS signal. The state machine may be in State 0 (i.e., a default state) until RFI is detected in the GPS signal. As previously discussed, RFI may be detected in the GPS signal when 100 consecutive magnitude bits (out of 128 samples) indicate the presence of RFI. The magnitude bits may indicate input signal levels into the GPS receiver. For example, the magnitude bits may indicate a "1" state (or a "hit") when its signal level (or signal power) exceeds an expected mean signal level (or mean signal power) by a specified deviation. When 100 consecutive magnitude hits are detected in the GPS signal in State 0, then the state machine may transition to State 1 (i.e., sending blank signals). In State 0, if 1280 zeros (i.e., magnitude bits that are non-hits) are detected in a row, then the AGC threshold may be lowered (i.e., State 3).

At State 1A, a blank signal may be communicated to the GPS receiver. In other words, the GPS signal may be multiplexed with a blanked output to produce a blank signal. As previously discussed, the blank signal may be communicated to the GPS signal when 100 consecutive magnitude hits are detected in the GPS signal in State 0. The blank signal may be communicated to the GPS receiver based on a timer. The timer may limit the period for which the blank signal is communicated to the GPS receiver. In one example, the timer may limit the blanking to a maximum of 100 microseconds. In other words, after pulsed RFI is detected, the blank signal may be communicated to the GPS receiver for up to 100 microseconds.

If the pulsed RFI stops within the 100 microseconds (i.e., the running sum does not detect 100 consecutive magnitude hits out of 128 total samples within the 100 microsecond period), then the state machine may transition to State 1B which continues blanking the signal for another 160 samples to clear the FIFO delay buffer of the "hit" samples.

If the pulsed RFI is longer than 100 microseconds (i.e., the running sum continues to detect 100 consecutive magnitude hits out of 128 total samples after the 100 microsecond period), then the RFI may be determined to be non-pulsed RFI. For example, the RFI may be caused by continuous wave (CW) jamming signals or broadband interference. Thus, if the timer expires (i.e., the pulsed RFI is longer than 100 microseconds), then the state machine may transition to State 2 and wait for the AGC to update so that the magnitude samples are not a "hit."

At State 1B, if the pulsed RFI stops within the timer period (e.g., 100 microseconds), the blank signal may continue to be communicated to the GPS receiver for an additional period of time. For example, the blank signal may be communicated to the GPS receiver for an additional 160 samples. By communicating the blank signal for the additional 160 samples, the edges of the pulsed RFI may be removed. In an alternative configuration, the blank signal may be communicated for a duration greater than or less than 160 samples. The state machine may transition to State 0 after the blank signal has been communicated for 160 samples.

Alternatively, if a new RFI pulse is detected in State 1B (i.e., during the communication of the blank signal for the 160 samples), then the state machine may transition to State 0. If the new RFI pulse is detected, then the state machine may transition to State 1A one clock cycle later. In other words, the state machine may remain in State 0 for one clock cycle. The new RFI pulse may be detected when at least 100 consecutive magnitude hits are detected in the GPS signal.

At State 2, the state machine may wait for the AGC to decrease RFI gain. The expiry of the timer may imply that the RFI is not pulsed. In other words, if the RFI occurs for longer than 100 microseconds, then the RFI may be implied to be continuous. Thus, the RFI may be longer than the 100 microsecond duration of the timer. The AGC may be adjusted until the magnitude of the RFI becomes a predetermined hit ratio. For example, the AGC may be adjusted until the magnitude of the RFI becomes a 16% hit ratio. In other examples, the percentage of magnitude hits may correspond to a specific GPS software algorithm. Alternatively, the AGC may be adjusted to compensate for the additional continuous RFI. In State 2, the non-blanked signal may be communicated to a GPS receiver or a SAASM. When the running sum of continuous magnitude hits are reduced via AGC control, the state machine may transition to State 0.

At State 3, the AGC may be reset to nominal strength. If 1280 consecutive magnitude non-hits are detected, then the AGC may be lowered to increase the signal gain until the magnitude of the RFI becomes a predetermined hit ratio. For example, after 1280 consecutive non-hits are detected, the AGC may be lowered to increase the signal gain until the magnitude of the RFI becomes a 16% hit ratio. The state machine may transition from State 3 to State 0 to initiate pulse RFI detection.

In one example, the GPS signal may include continuous RFI and then revert to a pulsed RFI. Since the AGC may have attenuated the intermediate frequency (IF) signal, the magnitude bit associated with the pulsed RFI may appear as a normal signal (i.e., a GPS signal without RFI) during the ON portion of the pulse. During the OFF portion of the pulse, the magnitude bit may appear as a string of zeros. As a result, the blank signal may not be multiplexed with the GPS signal because the GPS signal may be attenuated by the IF AGC. Thus, a string of zeros may be communicated to the AGC state machine for a predetermined time period (i.e., State 3). In one example, the string of zeros may be communicated to the AGC state machine for 10 milliseconds (ms). After the 10 ms, the AGC may return to maximum IF gain and pulsed RFI detection may be applied at State 0.

Figure 4:
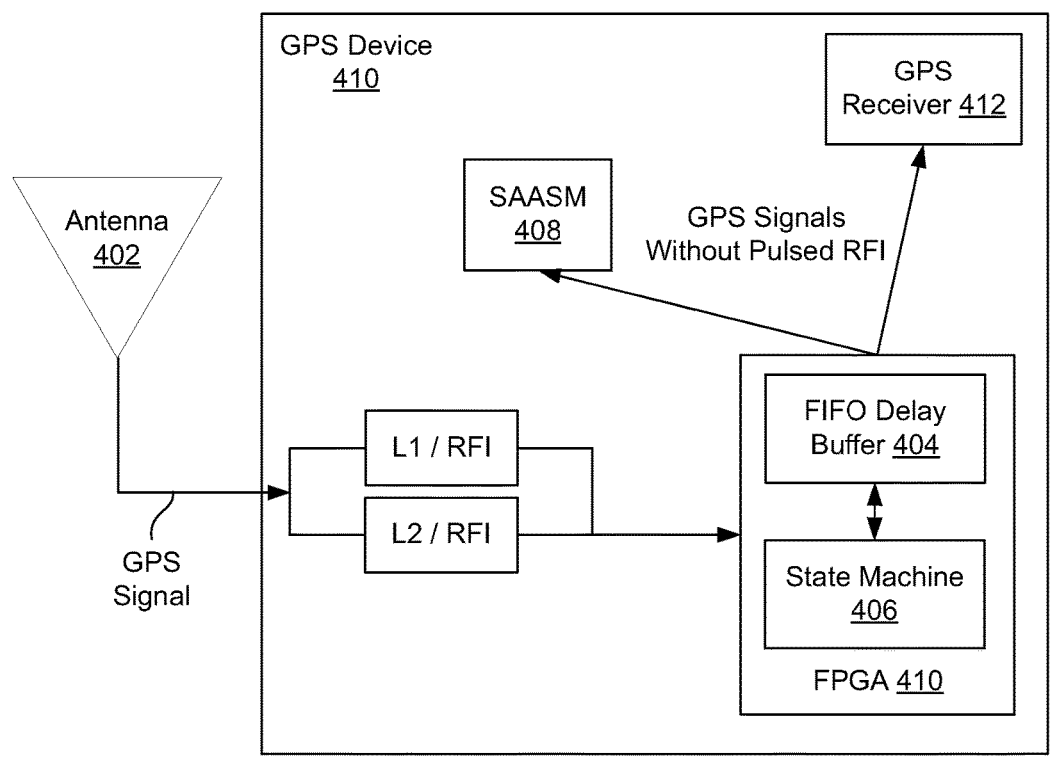
FIG. 4 is an example Global Positioning System (GPS) device that can receive a GPS signal with reduced radio frequency interference (RFI) in accordance with an embodiment of the present invention.

FIG. 4 is an example a GPS device 410. The GPS device 410 may be coupled to an antenna 402. The antenna 402 may receive a plurality of GPS signals from a plurality of satellites. The GPS signal a L1 signal (i.e., a GPS signal in a L1 frequency) and a L2 signal (i.e., a GPS signal in a L2 frequency). The L1 signal, the L2 signal, or the L1 and L2 signals may contain RFI. The RFI may be pulsed, continuous, or broadband. The GPS signal may be communicated to a First In-First Out (FIFO) delay buffer 404. The FIFO delay buffer 404 may temporarily store GPS signal samples.

A state machine 406 may detect pulsed RFI in the GPS signal based on the GPS signal samples that are temporarily stored in the FIFO delay buffer 404. The state machine 406 may select a blank signal to communicate to a Selective Availability Anti-Spoofing Module (SAASM) in place of the GPS signal with the pulsed RFI. Alternatively, the blank signal may be communicated to a GPS receiver 412. The blank signal may be communicated along with GPS signals that do not have pulsed RFI. In other words, GPS signals without pulsed RFI may be communicated to the GPS receiver 408, but the GPS signals may include one or more intervals of blank signals. The intervals of blank signals may indicate portions of the GPS signal where pulsed RFI was removed. The GPS receiver 412 may use the GPS signals to determine the location of the GPS device 412.

In one example, the FIFO delay buffer 404 and the state machine 406 may be included in a field programmable gate array (FPGA) 410. The Very-High Speed Integrated Circuits Hardware Description Language (VHDL) associated with the FPGA 410 may be modified to mitigate the amount of pulsed RFI in the GPS signal before the GPS signal is communicated to the SAASM 408 or the GPS receiver 412.

Figure 5:
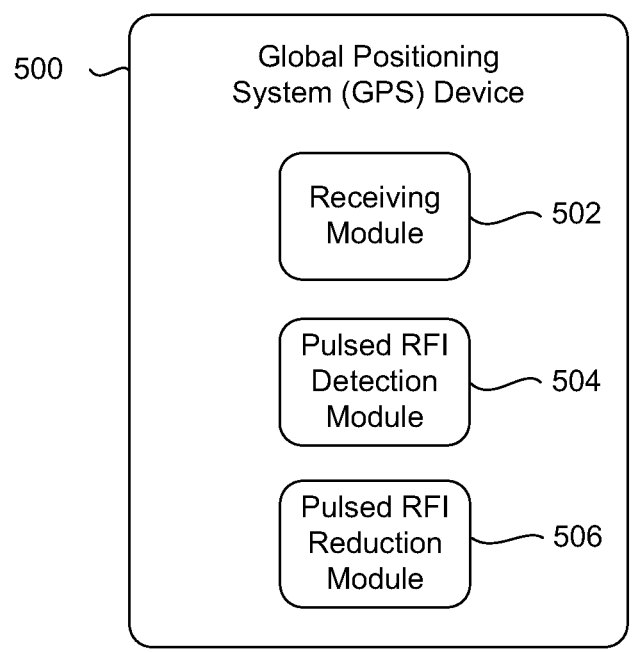
FIG. 5 is an example diagram of a Global Positioning System (GPS) device capable of receiving GPS signals with reduced radio frequency interference (RFI) in accordance with an embodiment of the present invention.

FIG. 5 is an example diagram of a Global Positioning System (GPS) device 500 capable of receiving GPS signals with reduced radio frequency interference (RFI). A receiving module 502 may be configured to receive the GPS signal at a GPS device, wherein the GPS device includes a GPS receiver and the GPS signal including a plurality of sign and magnitude bits.

A pulsed RFI detection module 504 may be configured to detect for pulsed RFI in the GPS signal based on samples of the magnitude bits in the GPS signal. The pulsed RFI detection module 504 may be further configured to detect at least 100 consecutive magnitude bits out of 128 samples indicating that the GPS signal includes the pulsed RFI.

A pulsed RFI reduction module 506 may be configured to reduce the amount of pulsed RFI received at the GPS receiver by communicating a blank signal to the GPS receiver for a predefined time period. In one example, the pulsed RFI reduction module 506 may be configured to communicate the blank signal for the predefined time period upon the samples of the magnitude bits indicating the pulsed RFI to the GPS receiver. In addition, the pulsed RFI reduction module 506 may be configured to multiplex the blank signal with the GPS signal for up to 100 microseconds upon detection of the pulsed RFI in the GPS signal, and reduce the amount pulsed RFI received at the GPS receiver by communicating the blank signal, to the GPS receiver, for an additional 160 samples after the 100 microseconds In accordance with one embodiment of the present invention, a method for reducing pulsed radio frequency interference (RFI) is disclosed. The method can comprise providing receiving the GPS signal at a GPS device, wherein the GPS device includes a GPS receiver and the GPS signal includes a plurality of sign and magnitude bits. In one example, the GPS signal may be received at a First In-First Out (FIFO) delay buffer included in the GPS device. The method can also comprise detecting pulsed RFI in the GPS signal based on samples of the magnitude bits in the GPS signal. Additionally, the method can comprise reducing the pulsed RFI received at the GPS receiver by communicating a blank signal when the samples of the magnitude bits indicate the pulsed RFI.

In one aspect, the method can further comprise communicating the blank signal to the GPS receiver for a predefined time period. In another aspect, the method can comprise communicating GPS signals that do not contain pulsed RFI to a selective availability anti-spoofing module (SAASM) included in the GPS device for a predefined time period. In addition, the method can comprise communicating GPS signals that do not contain pulsed RFI to the GPS receiver, the GPS signals including one or more intervals of blank signals.

In one aspect, the method comprises detecting pulsed RFI in the GPS signal by detecting at least 100 consecutive magnitude bits out of 128 samples indicate that the GPS signal contains the pulsed RFI. In addition, the method comprises lowering an automatic gain control (AGC) of the GPS device when 1280 consecutive samples of the magnitude bits do not indicate pulsed RFI. Furthermore, the method comprises detecting the pulsed RFI in the GPS signal based on GPS signal samples, and reducing the pulsed RFI received at the GPS receiver by communicating the blank signal to the GPS receiver for up to 100 microseconds in accordance with a timer.

In one aspect, the method comprises detecting that the GPS signal samples do not indicate the pulsed RFI when the blank signal is being communicated to the GPS receiver in accordance with the timer, and communicating the blank signal to the GPS receiver for an additional 160 samples for reducing the pulsed RFI received at the GPS receiver. In addition, the method comprises detecting that the samples of the GPS signal do not include the pulsed RFI by detecting that less than 100 consecutive magnitude bits out of 128 samples indicate a presence of pulsed RFI in the GPS signal.

In one aspect, the method comprises determining that GPS signal samples indicate continuous RFI upon expiry of the timer, and adjusting an automatic gain control (AGC) of the GPS device to compensate for the continuous RFI. In one example, adjusting the AGC includes providing a fixed ratio of 16% of the samples of the magnitude bits indicating pulsed RFI to the AGC. In addition, the method comprises receiving the GPS signal at a First In-First Out (FIFO) delay buffer included in the GPS device.

Various techniques, or certain aspects or portions thereof, may take the form of program code (i.e., instructions)

embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for reducing pulsed radio frequency interference (RFI), the method comprising:
    receiving a GPS signal at a GPS device, wherein the GPS signal includes a plurality of sign and magnitude bits and the GPS device includes a GPS receiver;
    detecting pulsed RFI in the GPS signal based on samples of the magnitude bits in the GPS signal;
    reducing the pulsed RFI received at the GPS receiver by communicating a blank signal when the samples of the magnitude bits indicate the pulsed RFI;
    detecting the pulsed RFI in the GPS signal based on GPS signal samples; and
    reducing the pulsed RFI received at the GPS receiver by communicating the blank signal to the GPS receiver for a predefined period of time in accordance with a timer.

2. The method of claim 1, further comprising communicating GPS signals that do not contain pulsed RFI to the GPS receiver, the GPS signals including one or more intervals of blank signals.

3. The method of claim 1, further comprising communicating GPS signals that do not contain pulsed RFI to a selective availability anti-spoofing module (SAASM) included in the GPS device.

4. The method of claim 1, further comprising detecting pulsed RFI in the GPS signal by detecting at least 100 consecutive magnitude bits out of 128 samples indicate that the GPS signal contains the pulsed RFI.

5. The method of claim 1, further comprising lowering an automatic gain control (AGC) of the GPS device to increase the signal gain when 1280 consecutive samples of the magnitude bits do not indicate pulsed RFI.

6. The method of claim 1, further comprising communicating the blank signal to the GPS receiver for up to 100 microseconds.

7. The method of claim 6, further comprising:
detecting that the GPS signal samples do not indicate the pulsed RFI when the blank signal is being communicated to the GPS receiver in accordance with the timer; and
communicating the blank signal to the GPS receiver for an additional 160 samples for reducing the pulsed RFI received at the GPS receiver.

8. The method of claim 1, further comprising detecting that the samples of the GPS signal do not include the pulsed RFI by detecting that less than 100 consecutive magnitude bits out of 128 samples indicate a presence of pulsed RFI in the GPS signal.

9. The method of claim 1, further comprising:
determining that GPS signal samples indicate continuous RFI upon expiry of the timer; and
adjusting an automatic gain control (AGC) of the GPS device to compensate for the continuous RFI.

10. The method of claim 9, wherein adjusting the AGC includes providing a fixed ratio of 16% of the samples of the magnitude bits indicating pulsed RFI to the AGC.

11. The method of claim 1, further comprising receiving the GPS signal at a First In-First Out (FIFO) delay buffer included in the GPS device.

12. A global positioning system (GPS) device, the GPS device comprising:
a FIFO delay buffer configured to receive a GPS signal with pulsed radio frequency interference (RFI);
a state machine configured to detect pulsed RFI in the GPS signal and communicate a blank signal instead of the GPS signal for a predefined time period; and
a positioning module configured to receive the blank signal and a GPS signal without pulsed RFI and determine a geographical location of the GPS device using the GPS signal without pulsed RFI,
wherein the state machine is configured to reduce the amount of pulsed RFI received at the positioning module by sending the blank signal to the positioning module upon detection of the pulsed RFI in the GPS signal.

13. The GPS device of claim 12, wherein the state machine is further configured to detect the pulsed RFI in the GPS signal by detecting 100 consecutive GPS signal samples out of 128 samples that indicate a presence of pulsed RFI in the GPS signal.

14. The GPS device of claim 12, wherein the state machine is configured to reduce the amount of pulsed RFI received at the positioning module by sending a blank signal, to the positioning module, for the predefined time period.

15. The GPS device of claim 12, wherein the state machine sends the blank signal to the positioning module for up to 100 microseconds.

16. The GPS device of claim 12, wherein the state machine is configured to:
determine that the GPS signal samples do not indicate pulsed RFI in the GPS signal; and
reduce the amount of pulsed RFI received at the GPS receiver by communicating a blank signal to the GPS receiver for an additional 160 samples.

17. The GPS device of claim 12, wherein the FIFO delay buffer and the state machine are included in a field programmable gate array (FPGA) circuit, the FPGA circuit being described by a plurality of Very High Speed Integrated Circuits (VHSIC) Hardware Description Language (VHDL) instructions.

18. A system for reducing pulsed radio frequency interference (RFI), the system comprising:
a receiving module configured to receive a GPS signal at a GPS device, the GPS device including a GPS receiver and the GPS signal including a plurality of sign and magnitude bits;
a pulsed RFI detection module configured to detect pulsed RFI in the GPS signal based on samples of the magnitude bits in the GPS signal; and
a pulsed RFI reduction module configured to reduce the pulsed RFI received at the GPS receiver by communicating a blank signal along with the GPS signal to the GPS receiver for a predefined time period,
wherein the pulsed RFI reduction module multiplexes the blank signal with the GPS signal when the pulsed RFI is detected in the GPS signal, and reduces the pulsed RFI received at the GPS receiver by communicating the blank signal to the GPS receiver for an additional predefined number of samples after predefined time period.

19. The system of claim 18, wherein the pulsed RFI detection module is further configured to communicate the blank signal for the predefined time period when the samples of the magnitude bits indicate the pulsed RFI.

20. The system of claim 18, wherein the pulsed RFI detection module is further configured to detect at least 100 consecutive magnitude bits out of 128 samples indicating that the GPS signal includes the pulsed RFI.

21. The system of claim 18, wherein the pulsed RFI reduction module
multiplexes the blank signal with the GPS signal for up to 100 microseconds; and
communicates the blank signal, to the GPS receiver, for an additional 160 samples after the 100 microseconds.

* * * * *